US012768430B2

(12) United States Patent
Dong et al.

(10) Patent No.: US 12,768,430 B2
(45) Date of Patent: Oct. 20, 2026

(54) SYSTEM WITH A PLANETARY GEARBOX

(71) Applicant: DANA (WUXI) TECHNOLOGY CO., LTD., JiangSu (CN)

(72) Inventors: Ling Dong, Wuxi (CN); Ke Liu, Wuxi (CN); Fabio Beccari, Bibbiano (IT)

(73) Assignee: DANA (WUXI) TECHNOLOGY CO. LTD., Wuxi (CN)

( * ) Notice: Subject to any disclaimer, the term of this patent is extended or adjusted under 35 U.S.C. 154(b) by 142 days.

(21) Appl. No.: 18/659,681

(22) Filed: May 9, 2024

(65) Prior Publication Data

US 2024/0418240 A1 Dec. 19, 2024

Related U.S. Application Data

(60) Provisional application No. 63/508,159, filed on Jun. 14, 2023.

(51) Int. Cl.

*F16H 1/28* (2006.01)
*E21B 3/02* (2006.01)
*E21B 7/02* (2006.01)
*F16H 57/04* (2010.01)

(52) U.S. Cl.

CPC ................. *F16H 1/28* (2013.01); *E21B 3/02* (2013.01); *E21B 7/02* (2013.01); *F16H 57/0486* (2013.01)

(58) Field of Classification Search

CPC ... E21B 3/02; E21B 7/02; E21B 3/022; F16H 1/28

See application file for complete search history.

(56) References Cited

U.S. PATENT DOCUMENTS

| | | | | |
|---|---|---|---|---|
| 3,216,270 | A | 11/1965 | Nasvytis | |
| 8,066,608 | B2 | 11/2011 | Sugiura et al. | |
| 8,839,854 | B2 * | 9/2014 | De Jong | F16H 1/28 166/85.1 |
| 10,295,020 | B2 * | 5/2019 | Rayner | F16H 57/0431 |
| 10,418,927 | B2 | 9/2019 | Calverley et al. | |
| 10,648,542 | B2 * | 5/2020 | Klein-Hitpass | F16H 57/082 |
| 2013/0186662 | A1 * | 7/2013 | Argent | E21B 3/022 173/47 |
| 2014/0125064 | A1 | 5/2014 | Hofmann et al. | |

FOREIGN PATENT DOCUMENTS

| | | | |
|---|---|---|---|
| CN | 201531565 | U | 7/2010 |
| EP | 1936233 | A2 | 6/2008 |
| WO | 2020015589 | A1 | 1/2020 |

* cited by examiner

*Primary Examiner* — Derek D Knight

(74) *Attorney, Agent, or Firm* — McCoy Russell LLP

(57) ABSTRACT

Systems and methods for a drilling machine. The drilling machine system, in one example, includes a gearbox with a planetary reduction and a floating input coupling directly coupled to or formed in a sun gear shaft that is included in the planetary reduction. Further, in the drilling machine system, the input coupling is unsupported by a bearing and rotational axes of the floating input and the sun gear shaft are coaxially arranged.

15 Claims, 3 Drawing Sheets

SYSTEM WITH A PLANETARY GEARBOX

CROSS REFERENCE TO RELATED APPLICATION

The present application claims priority to U.S. Provisional Application No. 63/508,159, entitled "SYSTEM WITH A PLANETARY GEARBOX", and filed on Jun. 14, 2023. The entire contents of the above-listed application are hereby incorporated by reference for all purposes.

TECHNICAL FIELD

The present disclosure relates to a drilling machine system with a gearbox that includes a floating input coupling.

BACKGROUND AND SUMMARY

Planetary gearboxes have been used in machinery such as drilling rigs due to their ability to achieve target gear ratios in a space efficiency package. To elaborate, rotary drilling rig machines have utilized planetary gearboxes, to provide torque to a drilling tool in the machine. These machines can be used in the construction of water wells, oil wells, and natural gas wells, for instance.

The inventors have recognized several issues with previous planetary gearboxes that have been utilized in drilling rigs. For instance, certain gearboxes may reach undesirable temperatures during operation due to the relatively high speed at which they are driven. The high operating temperature of the gearbox may increase component wear such as wear on the gears, seals, and bearings, in some cases. The increased component wear leads to diminished component lifespan which may decrease the continuous run-time of the machinery employing the planetary gearbox which may ultimately decrease customer satisfaction, in some cases.

The inventors have recognized the aforementioned issues with previous gearboxes and developed a drilling machine system to at least partially overcome the issues. In one example, the drilling machine system includes a gearbox with a planetary reduction and a floating input coupling that is directly coupled to or formed in a sun gear shaft that is included in the planetary reduction. In the drilling machine system, the input coupling is unsupported by a bearing and rotational axes of the floating input and the sun gear shaft are coaxially arranged. Providing an unsupported input coupling allows the gearbox's operating temperature and system compactness to be reduced, when compared to previous drilling machine gearboxes. Customer appeal is increased as a result.

In one example, the drilling machine system may further include a motor rotationally coupled to the input coupling. In such an example, the motor may be positioned vertically above the planetary gearbox. Continuing with this example, oil may be contained within a housing of the gearbox and having a level that is vertically below an interface between the input coupling and the sun gear. In this way, the oil temperature is reduced when compared to systems which use a bearing and an oil level above the bearing. As a result, the component longevity in the system is further increased and system efficiency is increased, due to the decrease in windage losses when compared to gearboxes with higher oil levels.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A drilling machine system is described herein that utilized a gearbox with a planetary reduction that includes a sun gear shaft which is directly coupled to or formed on a floating input coupling. Using a floating input coupling and sun gear allows the system to achieve decreased gearbox operating temperature, thereby increasing component longevity, and increased compactness. Specifically, bearing, seal, and gear longevity may be increased due to the decrease in the internal gearbox temperature and the continuous duty-cycle of the system is enhanced. Further, the floating input coupling is unsupported by a bearing which allows the oil level in the system to be reduced. To elaborate, the oil level may be at location which is below a mechanical interface between the sun gear shaft and the input coupling. Decreasing the oil level allows system efficiency to be increased, due to the decreased windage losses.

Figure 1:
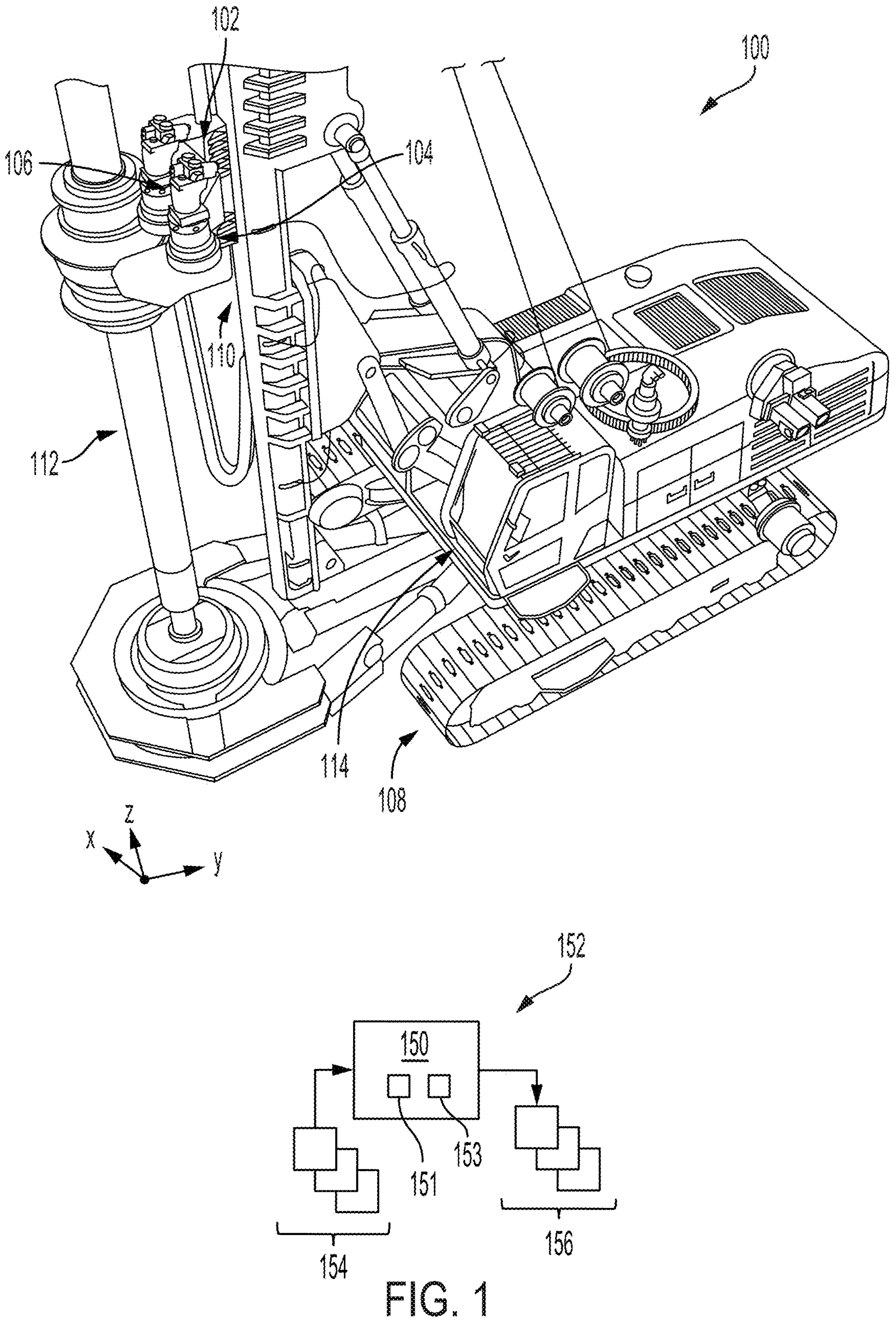
FIG. 1 shows a drilling machine with a drilling machine system with a gearbox and a motor.

FIG. 1 shows a drilling machine 100 with a drilling machine system 102 that includes a gearbox 104 which is driven by a motor 106 (e.g., a hydraulic motor, an electric motor, or a pneumatic motor). In the illustrated example, the drilling machine 100 is embodied as a tracked vehicle with tracks 108 that allow the machine to be propelled on the ground or otherwise position the machine in a desired manner. An internal combustion engine and/or electric motor may be used to provide mechanical power to the tracks, in the illustrated embodiment or wheels in alternate embodiments. The drilling machine further includes a boom 110 and a rotary drive drilling tool 112, in the illustrated example. A cabin 114 the drilling machine is further depicted in the illustrated example. However, the drilling machine The drilling machine system 102 provides mechanical power to the rotary drive drilling tool 112, in the illustrated example. Further, as elaborated upon herein, the rotational axis of the drilling machine system 102 may be parallel to a gravitational axis. In other words, the rotational axis of the drilling machine system is vertically aligned. Further, the rotational axis of the rotary drilling tool also may be parallel to the gravitational axis, when the tool is in use.

An axis system is provided in FIG. 1 as well as FIGS. 2-5, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

A controller 150 may form a portion of a control system 152. The controller 150 includes a processor 151 and memory 153. The control system 152 is shown receiving information from sensors 154 and sending control signals to actuators 156. As one example, the sensors 154 may include sensors a motor speed sensor, a gearbox speed sensor, and the like. The actuators 156 may include an actuator for the motor 106 and the like. The controller 150 may receive input data from the sensors, process the input data via a processor, and trigger the actuators in response to the processed input data based on instruction or code programmed therein corresponding to one or more routines. In some examples, the controller 150 may include instructions that send a command signal to the motor 106 to adjust motor speed.

Figure 2:
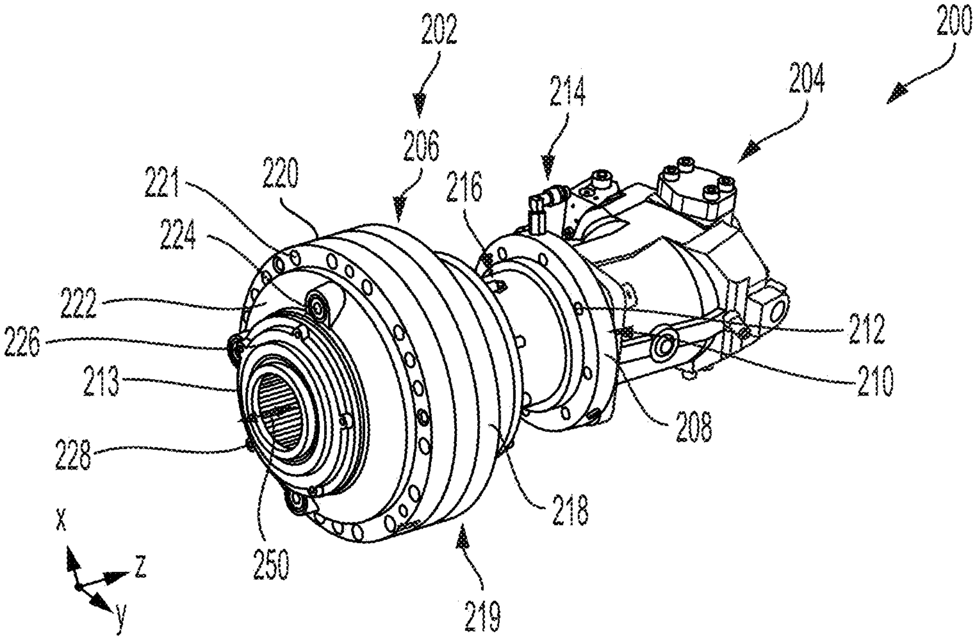
FIG. 2 shows a detailed view of an example of a drilling machine system with a gearbox and a motor.

FIG. 2 shows an example of a drilling machine system 200 with a gearbox 202 (e.g., a planetary gearbox) that is driven by a motor 204. The drilling machine system 200 serves as an example of the drilling machine system 102 shown in FIG. 1. The motor 204 may be a hydraulic motor (e.g., a variable displacement hydraulic motor). In such an example, the hydraulic motor converts high pressure working fluid (e.g., oil) power to mechanical power. However, in other examples, the motor 204 may be an electric motor or a pneumatic motor. When a hydraulic motor is used in the system, the system may be more efficiently incorporated into the machine due to the machine's use of other hydraulic systems, in some cases.

The gearbox 202 includes a housing 206 with an input adapter 208 that at least partially encloses a floating input coupling which is discussed in greater detail herein. The gearbox 202 further includes a planetary reduction 300 (e.g., a simple planetary reduction), shown in FIG. 3, and discussed in greater detail herein. The planetary reduction in the gearbox may include a first stage and a second stage. However, in other examples, the gear assembly may include a single stage or three or more stages. The gearbox 202 may further include an intermediate flange 218 and an output support 220.

The input adapter 208 may include a flange 210 with openings 212 for attachment devices which allow the planetary gearbox 202 to be removably coupled to the motor 204. The gearbox 202 may further include an output coupling 213 which may include splines, a flange with openings, combinations thereof, and the like. A rotational axis 250 of the planetary gearbox 202 is provided for reference in FIG. 2 as well as FIGS. 3-5.

The gearbox housing 206 may include an oil breather and oil fill plug 214 coupled thereto as well as an oil level sight plug 216. The housing 206 may include a body 219 that encloses the planetary reduction and may include an output support 220 with openings 221 for attachment devices. A section 222 may be coupled to the body 219 via attachment devices 224 and another section 226 may be coupled to the housing section 222 via attachment devices 228. The housing sections 222 and 226 allow the housing to form an enclosure that seals an output bearing discussed in greater detail herein. However, other suitable housing configurations have been contemplated.

Figure 3:
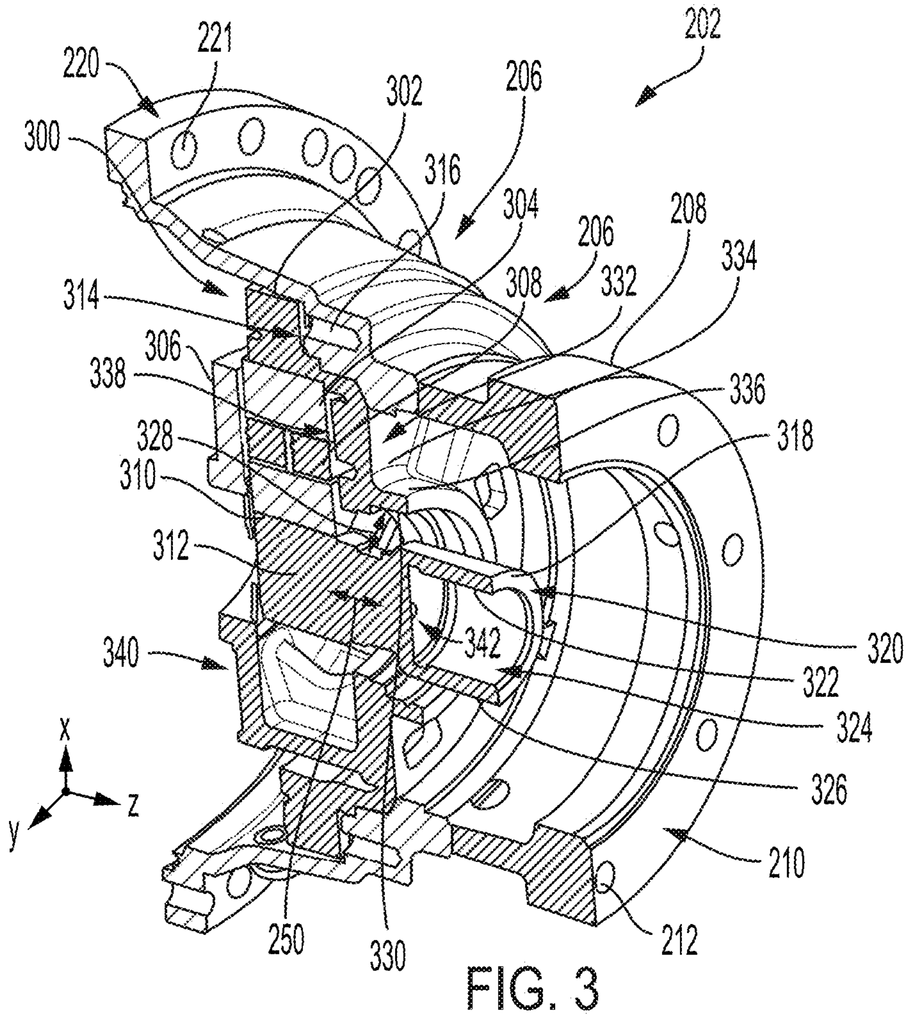
FIG. 3 shows a cross-sectional view of the input configuration system, depicted in FIG. 2.

FIG. 3 shows a cross-sectional view of the input side of the gearbox 202 with the planetary reduction 300. The cutting plane for the cross-sectional view extends through the rotational axis 250 of the gearbox.

In the illustrated example, the planetary reduction 300 includes a ring gear 302, planet gears 304, a carrier 306, bearings 308 (e.g., needle roller bearings) coupled to the planet gears and the carrier, and a sun gear 310 with a sun gear shaft 312. As such, the sun gear 310 meshes with the planet gears 304 which mesh with the ring gear 302. Therefore, in such an example, the planetary reduction 300 is a simple planetary gear reduction that solely includes the aforementioned gear components. In this way, the gearbox is able to achieve a desired gear ratio in a space efficient package, if desired. However, in alternate examples, the planetary reduction may be a compound planetary reduction, for instance. In such an example, the complexity of the gear set is increased, thereby decreasing gearbox compactness. It will be understood that the gear meshes described herein are formed via mated teeth.

The input of the planetary reduction 300 is the sun gear 310 and the output of the planetary reduction is the carrier 306, in the illustrated example. Further, in the illustrated example, the ring gear 302 is grounded by the housing 206. Specifically, the ring gear 302 may be attached to a stepped section 314 in the interior of the housing 206 via attachment devices 316 (e.g., bolts, screws, and the like). However, the planetary reduction 300 may have other configurations with regard to the input, the output, and the grounded component. For instance, one or more planetary stages may be incorporated into the gearbox to increase the gearbox's ratio, in other examples. For instance, as discussed in greater detail herein the gearbox may include two planetary stages.

A floating input coupling 318 is further shown in FIG. 3. In the illustrated example, the floating input coupling is formed with the sun gear shaft 312 such that they form a continuous (e.g., monolithic) structural component. However, as discussed in greater detail herein, the floating input coupling may be directly rotationally coupled to the sun gear shaft via splines and/or other suitable mechanical coupling. Forming the floating input coupling and the sun gear as a monolithic structure allows the height of the floating input coupling 318 along the z-axis may be reduced, if desired, thereby increasing gearbox compactness. Additionally, manufacturing may be simplified and the structural integrity of the structure is increased when the floating input coupling and the sun gear shaft are formed as a monolithic unit.

Further, when the floating input coupling 318 is decoupled from the motor 204 (shown in FIG. 2), prior to system assembly, the floating input coupling is unsupported at its end 320. Thus, a bearing is not directly coupled to the end 320 of the floating input coupling thereby simplifying gearbox design and allowing the gearbox to achieve increased space efficiency if desired.

The floating input coupling 318 may include an inner surface 322 which may define a boundary of a recess 324. The floating input coupling 318 may further include an outer surface 326. The inner surface 322 and the outer surface 326 may have constant diameters along their length, thereby forming an annular wall. However, other input coupling contours have been contemplated. An output shaft of the motor 204 (shown in FIG. 2) may be mated with (e.g., interference fit, splined, welded, combinations thereof) with the recess 324. To elaborate, in one example, the recess 324 may be splined. Additionally or alternatively, attachment devices may be used to rotationally couple the input coupling and the motor's output shaft.

A gap 328 may be formed between the outer surface 326 of the floating input coupling 318 and an inner surface 330 of an extension 332 of the carrier 306. In this way, the input coupling is unsupported by a bearing along with the sun gear. As such, the outer surface 326 has a smaller diameter than the inner surface 330. Providing the floating input coupling in the gearbox allows the space efficiency of the gearbox to be increased while decreasing friction and therefore heat in the gearbox by reducing the oil level in the gearbox. Consequently, gearbox component longevity is increased.

The extension 332 includes a radially extending section 334 and an axially extending section 336, in the illustrated example. However, the extension may have another suitable contour, in alternate examples. Additionally, a gap 338 may be formed between the planet gears 304 and the carrier extension 332. In the illustrated example, the carrier 306 includes another section 340 which may be rotationally coupled to (e.g., directly rotationally coupled to) the output coupling 213, shown in FIG. 2. The input adapter 208 with the flange 210 that includes openings 212 in the housing 206 is again depicted in FIG. 3. The output support 220 with openings 221 in the housing 206 is again depicted in FIG. 3. It will be understood that an oil level in the gearbox 202 is able to be reduced if desired. To elaborate, the oil level in the gearbox may be below or equal to the vertical height of a rear wall 342 of the recess 324. The reduction in oil level in the gearbox is expanded upon herein with regard to FIG. 5.

Figure 4:
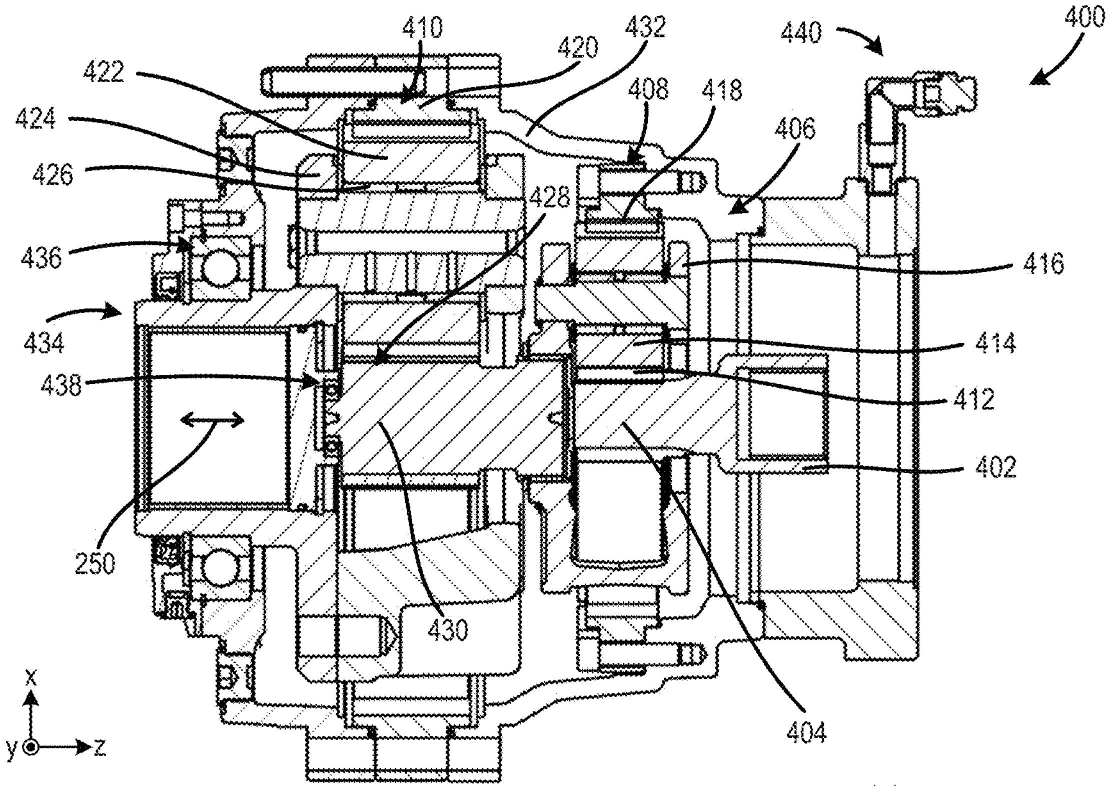
FIG. 4 shows a cross-sectional view of another example of a gearbox.

FIG. 4 shows an example of a gearbox 400 (e.g., a planetary gearbox) with a floating input coupling 402 that is integrally formed with a sun gear shaft 404 and is unsupported by a bearing to reduce an oil level in the gearbox and as a consequence the gearbox's operating temperature is reduced. In this way, the input coupling and the sun gear may form a monolithic structure. Further, forming the input coupling in this manner allows gearbox length to be reduced, if desired. Reducing the gearbox length permits gear alignment and centering to be enhanced. At least a portion of the structural and/or features from the gearbox 202 shown in FIGS. 2-3 may be included in the gearbox 400 shown in FIG. 4 and the other gearboxes described herein and vice versa.

The gearbox 400 further includes a multi-stage reduction 406 that may include first stage 408 and a second stage 410. A such, the multi-stage reduction may be a two stage reduction, in one example. To elaborate, the first and second stages may be achieved through the use of simple planetary gear sets which allow the gearbox to achieve a desired gear ratio in a compact package. However, the multi-stage reduction may include additional stages and/or different planetary gear set architectures, in other examples. The first stage 408 includes a sun gear 412 formed on or otherwise coupled to the sun gear shaft 404. The first stage further includes planet gears 414 that rotate on a carrier 416. The planet gears 414 mesh with a ring gear 418. The ring gear 418 is grounded by a housing 432, in the illustrated example.

The second stage 410 includes a ring gear 420, planet gear 422, a carrier 424, bearings 426 (e.g., needle roller bearings), and a sun gear 428 which is formed on or coupled to a sun gear shaft 430. The sun gear shaft 430 may be rotationally coupled to the carrier 416. The housing 432 may at least partially enclose the first stage 408 and the second stage 410. The ring gear 420 is grounded by a housing 432, in the illustrated example. Thus, the input and the output of the first and second planetary gear set is the sun gear and the carrier in each of the gear sets.

The carrier 424 is rotationally coupled to (e.g., directly rotationally coupled to) an output coupling 434. A bearing 436 may be coupled to the output coupling 434 and the housing 432. Further, a bearing 438 may be coupled to the output coupling 434 and the sun gear 428. An oil breather 440 may further be coupled to the housing. It will be understood that oil may be provided in the gearbox enclosure shown in FIG. 4 as well as the other gearboxes described herein during manufacturing or installation and sustained in the enclosure. In other words, the oil in the gearboxes may not be circulated through a pump and heat exchanger.

Figure 5:
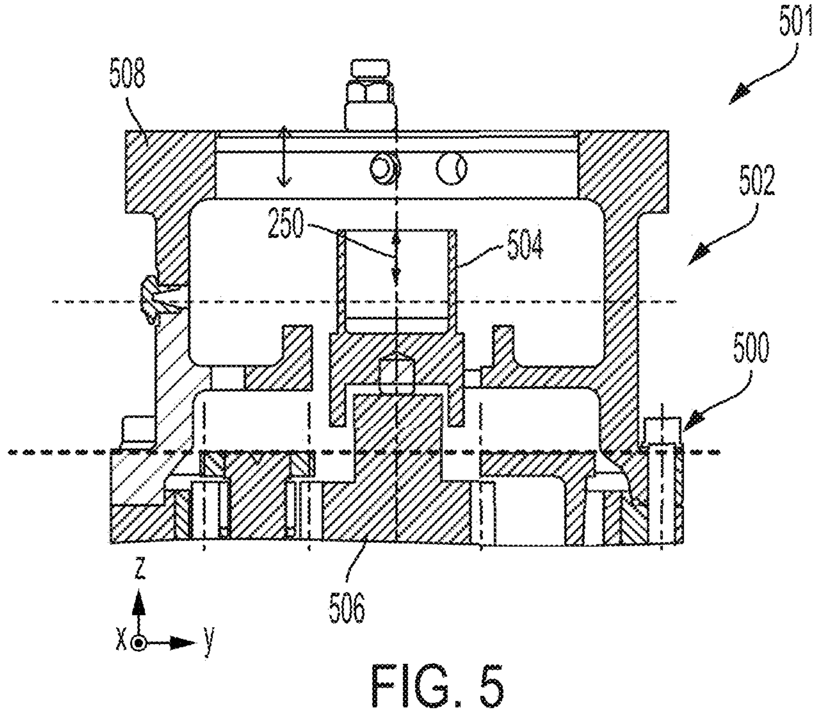
FIG. 5 shows another example of an input configuration system with a planetary gearbox.

FIG. 5 shows the decreased oil level 500 which is achieved by a gearbox 501 (e.g., a planetary gearbox) in comparison to an oil level 502 in previous gearbox designs with an input bearing for input coupling alignment. An input coupling 504 is again shown along with a sun gear shaft 506 and a housing 508. In the illustrated example, the input coupling 504 is splined and/or otherwise rotationally coupled to the sun gear shaft 506. As shown, the input coupling 504 does not include a bearing coupled thereto. Consequently, the oil level in the gearbox is able to be reduced to increase gearbox longevity and reduce gearbox size and/or weight, if desired. In other words, the thermal energy in the gearbox is reduced by omitting the bearing and reducing the oil level, thereby increasing the lifespan of the gears and other components in the gearbox. For instance, in one use-case example, the temperature of the gearbox may be reduced by approximately 10° C. by reducing the oil level in the gearbox when compared to a gearbox that includes a bearing on the input coupling with a higher oil level for bearing lubrication. Further, an external oil cooling system may be forgone, if desired, due to the reduction in gearbox operating temperature. In such an example, the oil in the machine may be sealed therein and not directed to external components. Consequently, the machine's architecture may be further simplified, if wanted.

The gearboxes described herein allow the gearbox's operating temperature to be reduced and its space efficiency to be increased, if desired, by reducing the oil level in the system due to a removal of a bearing from the gearbox. Consequently, the lifespans of the gearbox components are increased, allowing machines that employ the gearbox to increase their run-time, if desired, thereby increasing customer appeal.

FIGS. 1-5 provide for a method of operation of a drilling machine system. The method may be implemented by any of the systems described herein or combinations of the systems. Further, the method may be implemented as instructions stored in memory which is executable by a processor. The method includes transferring rotational energy from a motor to a floating input coupling in a gearbox. The method further includes in one example, transferring rotational energy from the planetary reduction to a rotatory drive drilling tool.

The technical effect of the drilling machine operating methods described herein is to increase component and gearbox longevity via a reduction in gearbox temperature.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Further, elements offset from one another and coaxial to one another may be referred to as such.

The invention will be further described in the following paragraphs. In one aspect, a system is provided that comprises a gearbox including: a gear reduction; and an input coupling formed in a sun gear shaft that is included in the multi-stage reduction; wherein the input coupling is unsupported by a bearing. In one example, the system may further comprise a motor rotationally coupled to the input coupling. Further in one example, the motor may be a hydraulic motor. In one example, the system may be included in a drilling machine. Still further, in one example, the motor may be a hydraulic motor, an electric motor, or an air motor.

In another aspect, a gearbox is provided that comprises a gearbox including: a gear reduction; and an input coupling formed in a sun gear shaft that is included in the gear reduction; wherein the input coupling is unsupported by a bearing and a gap is formed between an outer surface of the input coupling and a section of a carrier in the gear reduction. Further, in one example, the input coupling may form a continuous structure with the sun gear. Still further, in one example, the gearbox may include an output coupling configured to rotationally couple to a drill. In one example, the multi-stage reduction may be a two-stage reduction. In one example, the two-stage reduction may include two simple planetary gear sets. In one example, the input coupling and the sun gear may form a monolithic structure. Further, in one example, the gear reduction may be a single stage reduction. Still further in one example, the gear reduction may include three or more stages.

In another aspect, a drilling machine system is provided that comprises a gearbox including: a planetary gear reduction; and a floating input coupling directly coupled to or formed in a sun gear shaft that is included in the planetary gear reduction; wherein the input coupling is unsupported by a bearing; and wherein rotational axes of the floating input and the sun gear shaft are coaxially arranged. In one example, the drilling machine system may further comprise a motor rotationally coupled to the input coupling. In another example, the motor may be a hydraulic motor, an electric motor, or a pneumatic motor. In yet another example, the motor may be a hydraulic motor and the floating input coupling may be configured to directly rotationally couple to the hydraulic motor. In yet another example, the motor may be positioned vertically above the gearbox. In another example, the drilling machine system may further comprise oil contained within a housing of the gearbox and having a level that is vertically below an interface between the input coupling and the sun gear. In another example, the rotationally axes may be vertically aligned. In another example, the planetary reduction may be a simple planetary reduction. In another example, a carrier in the simple planetary reduction may be configured to rotationally coupled to a rotary drive drilling tool. In yet another example, a ring gear may be grounded by a gearbox housing. In another example, the carrier may be directly coupled to an output coupling.

In another aspect, a method for operation of a drilling machine system is provided that comprises: transferring rotational energy from a motor to a floating input coupling in a gearbox; wherein the gearbox includes: a planetary gear reduction; and the floating input coupling directly coupled to or formed in a sun gear shaft that is included in the planetary gear reduction; wherein the input coupling is unsupported by a bearing; wherein rotational axes of the floating input and the sun gear shaft are coaxially arranged. In another example, the rotational axes may be vertically arranged. In yet another example, a level of oil within the gearbox may be vertically below an interface between the input coupling and the sun gear. In another example, the method may further comprise transferring rotational energy from the planetary reduction to a rotatory drive drilling tool.

In another aspect, a drilling machine system is provided that comprises a gearbox including: a planetary reduction including a grounded ring gear, a carrier directly coupled to an output coupling, a plurality of planet gears, and a sun gear that includes a sun gear shaft; and a floating input coupling directly coupled to or formed in the sun gear shaft that is included in the planetary reduction; wherein the input coupling is unsupported by a bearing; and a motor directly rotationally coupled to the floating input coupling. In one example, the motor may be a variable displacement hydraulic motor. In another example, the motor may be an electric motor or a pneumatic motor. Further, in one example, a gap may be formed between an outer surface of the input coupling and a section of a carrier in the planetary reduction. In yet another example, the drilling machine system may further comprise a rotary drive drilling tool rotationally coupled to the carrier.

In another representation, a drilling machine ring assembly is provided that comprises a variable displacement hydraulic motor directly rotationally coupled to a gearbox that includes a simple planetary gear set which include a floating sun gear that is directly rotationally coupled to a floating input shaft, wherein a carrier of the simple planetary gear set is rotationally coupled to a drill.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to systems that include different types of power sources including different types of motors. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A drilling machine system, comprising:
- a gearbox including:
  - a planetary reduction; and
  - a floating input coupling directly coupled to or formed in a sun gear shaft that is included in the planetary reduction;
- a motor rotationally coupled to the floating input coupling; and
- wherein an oil is contained within a housing of the gearbox and has a level that is vertically below an interface between the floating input coupling and a sun gear;
- wherein the floating input coupling is unsupported by a bearing; and
- wherein rotational axes of the floating input coupling and the sun gear shaft are coaxially arranged.

2. The drilling machine system of claim 1, wherein the motor is a hydraulic motor, an electric motor, or a pneumatic motor.

3. The drilling machine system of claim 1, wherein the motor is a hydraulic motor and the floating input coupling is configured to directly rotationally couple to the hydraulic motor.

4. The drilling machine system of claim 1, wherein the motor is positioned vertically above the gearbox.

5. The drilling machine system of claim 1, wherein the rotationally axes are vertically aligned.

6. The drilling machine system of claim 1, wherein the planetary reduction is a simple planetary reduction.

7. The drilling machine system of claim 6, wherein a carrier in the simple planetary reduction is configured to rotationally coupled to a rotary drive drilling tool.

8. The drilling machine system of claim 6, wherein a ring gear is grounded by a gearbox housing.

9. The drilling machine system of claim 7, wherein the carrier is directly coupled to an output coupling.

10. A method for operation of a drilling machine system, comprising:
- transferring rotational energy from a motor to a floating input coupling in a gearbox;
- wherein the gearbox includes:
  - a planetary reduction; and
  - the floating input coupling directly coupled to or formed in a sun gear shaft that is included in the planetary reduction;
- wherein the floating input coupling is unsupported by a bearing;
- wherein rotational axes of the floating input coupling and the sun gear shaft are coaxially arranged;
- wherein the rotational axes are vertically arranged; and
- wherein a level of oil within the gearbox is vertically below an interface between the input coupling and a sun gear.

11. The method of claim 10, further comprising transferring rotational energy from the planetary reduction to a rotatory drive drilling tool.

12. A drilling machine system, comprising:
- a gearbox including:
  - a simple planetary reduction solely including a grounded ring gear, a carrier directly coupled to an output coupling, a plurality of planet gears that are rotationally coupled to the carrier and mesh with the ring gear, and a sun gear that includes a sun gear shaft, wherein the sun gear meshes with the plurality of planet gears; and
  - a floating input coupling directly coupled to or formed in the sun gear shaft that is included in the simple planetary reduction;
- wherein the floating input coupling is unsupported by a bearing; and
- wherein an oil is contained within a housing of the gearbox and has a level that is vertically below an interface between the floating input coupling and the sun gear; and
- a motor directly rotationally coupled to the floating input coupling.

13. The drilling machine system of claim 12, wherein the motor is a variable displacement hydraulic motor.

14. The drilling machine system of claim 12, wherein a gap is formed between an outer surface of the floating input coupling and a section of the carrier in the simple planetary reduction.

15. The drilling machine system of claim 12, further comprising a rotary drive drilling tool rotationally coupled to the carrier.

* * * * *